Patented Sept. 22, 1936

2,055,074

UNITED STATES PATENT OFFICE 2,055,074

MONOAZO DYESTUFFS

Richard Fleischhauer, Frankfort-on-the-Main-Fechenheim, Germany, assignor to General Aniline Works, Inc., New York, N. Y., a corporation of Delaware No Drawing. Original application October 7, 1933, Serial No. 692,700. Divided and this application April 30, 1935, Serial No. 19,118. In Germany October 13, 1932

4 Claims. (Cl. 260—92)

The present application is a division of my application Serial No. 692,700, filed October 7, 1933, and relating to monoazodyestuffs.

My present invention relates to monoazodyestuffs more particularly to those corresponding to the general formula:

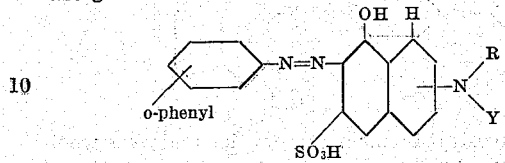

wherein Y means hydrogen, alkyl or phenyl, R means acetyl or benzoyl or the urethane radicle and wherein the phenyl nuclei contain a member of the group consisting of hydrogen halogen, and sulfonic acid.

These dyestuffs are obtained by combining a diazo compound of an aminodiphenylether with a 2- or 3- or 4- acylamino-8-hydroxy-naphthalene-6-sulfonic acid of the formula:

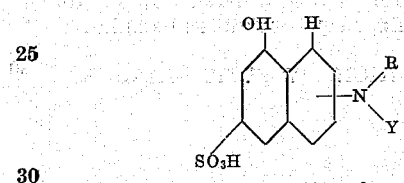

wherein R and Y have the aforesaid signification.

In order to further illustrate my invention the following examples are given; but I wish it, however, to be understood that my invention is not limited to the particular products or reaction condition stated therein.

Example 1

18.5 parts of 2-amino-diphenylether are diazotized in the usual manner. The obtained diazo-solution is allowed to run while cooling into a solution of 28.5 parts of 2-acetylamino-8-naphthol-6-sulfonic acid containing an excess of sodium bicarbonate. When developing is finished, the dyestuff is isolated and dried. It forms a red-brown water-soluble powder corresponding to the formula:

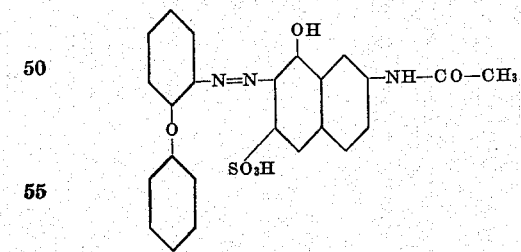

and dyeing the animal fiber bright equal red shades.

When using as diazo-component 4-amino-diphenyl-ether or 2 - amino - 4' - methyl-diphenyl-ether or 2-amino-4-chloro-diphenyl-ether, dyestuffs of similar properties are obtained.

By replacing the diazo-component by the equivalent amount of 4-amino-diphenyl-ether-2-sulfonic acid, a red dyestuff is obtained dyeing wool equal shades of a very good fastness to light, fulling and perspiration.

In the same manner e. g. 2-benzoyl-amino-8-naphthol-6-sulfonic acid or the urethane of the 2-amino-8-naphthol-6-sulfonic acid may be used as combining components.

Example 2

By using in Example 1, paragraph 3, instead of 2-acetyl-amino-8-naphthol-6-sulfonic acid the same quantity of 2-acetyl-amino-5-naphthol-7-sulfonic acid, a brick-red water-soluble dyestuff is obtained which corresponds to the following formula:

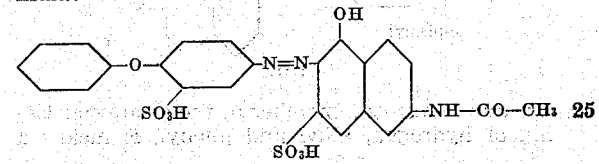

and dyes wool from an acid bath bright orange shades of a very good fastness to light.

Still more yellowish dyestuffs of a similar brightness may be obtained by using as diazo-components 4-amino-diphenyl-ether, 4-amino-diphenyl-ether - 2 - sulfonic acid, 4 - amino - diphenyl-ether-3-sulfonic acid, 2 -amino-diphenyl-ether-4-sulfonic acid and so on.

A dyestuff of similar properties is formed by developing diazotized 4-amino-diphenyl-ether-2-sulfonic acid with 2-(2', 5'-dichloro-benzoyl)-methyl-amino-5-naphthol-7-sulfonic acid.

Example 3

18.5 parts of 4-amino-diphenyl-ether are diazotized in the usual manner. The diazo-solution is then allowed to run into a solution of 30 parts of 2-(acetyl - methyl - amino)-8-naphthol-6-sulfonic acid containing the necessary amount of sodium bicarbonate. When developing is finished the dyestuff is isolated. It forms a red water-soluble powder which corresponds to the following formula:

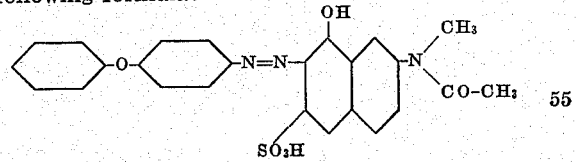

dyeing wool very equal bright red shades which are fast to light.

By using as combining components 2-(benzoyl-methyl-amino)-8-naphthol-6-sulfonic acid or 2-(acetyl-phenyl-amino)-8-naphthol-6-sulfonic acid or 2-(acetyl-cyclohexyl-amino)-8-naphthol-6-sulfonic acid similar dyestuffs are obtainable.

*Example 4*

18.5 parts of 4-amino-diphenyl-ether are diazotized as described in Example 1 and developed with a solution of 29 parts of 1-acetyl-amino-5-naphthol-7-sulfonic acid in the presence of sodium bicarbonate. The dyestuff thus obtained represents after isolating and drying a brown-red water-soluble powder and corresponds to the following formula:

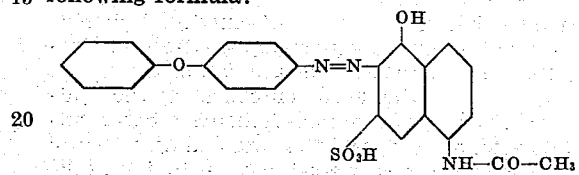

It dyes the animal fiber equal bright red shades.

Very good leveling bright red dyestuffs of very good fastness qualities are obtained by developing the diazo-compound of 2-amino-4-chloro-diphenyl-ether or of 4-amino-diphenyl-ether-2-sulfonic acid respectively with 2-(acetyl-methyl-amino)-8-naphthol-6-sulfonic acid.

I claim:

1. The mono-azodyestuffs corresponding to the general formula:

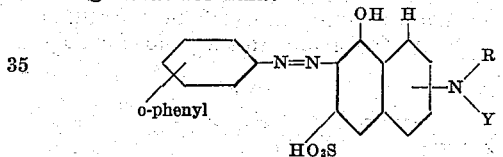

wherein Y means a member of the group consisting of hydrogen, alkyl and phenyl, R means a member of the group consisting of acetyl and benzoyl and wherein the phenyl nuclei contain a member of the group consisting of hydrogen, halogen, and sulfonic acid, which dyestuffs dye animal fibers orange to red shades of a good leveling power and fastness to light.

2. The monoazodyestuff of the formula:

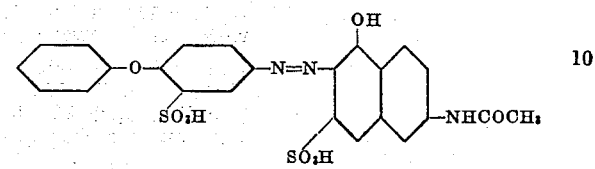

which dyestuff forms a brick-red water-soluble powder and dyes wool from an acid bath bright orange shades of a very good fastness to light.

3. The monoazodyestuff of the formula:

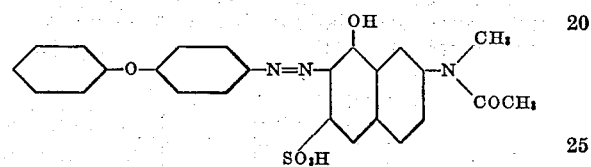

which dyestuff forms a red powder and dyes wool very equal bright red shades fast to light.

4. The mono-azodyestuff of the formula:

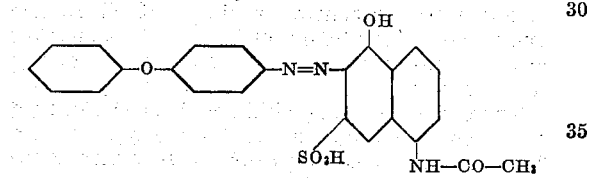

which dyestuffs forms a brown-red powder and dyes the animal fiber equal bright red shades.

RICHARD FLEISCHHAUER.